Aug. 2, 1966     S. J. VERONA     3,263,872

DISPENSER WITH A MEASURING DEVICE

Filed March 16, 1965     2 Sheets-Sheet 1

INVENTOR.
SALVADORE J. VERONA
BY

ATTORNEY

Aug. 2, 1966  S. J. VERONA  3,263,872
DISPENSER WITH A MEASURING DEVICE
Filed March 16, 1965  2 Sheets-Sheet 2

INVENTOR.
SALVADORE J. VERONA
BY
Malcolm S. Bradway
ATTORNEY

United States Patent Office 3,263,872
Patented August 2, 1966

3,263,872
DISPENSER WITH A MEASURING DEVICE
Salvadore J. Verona, 3369 S. Howell Ave.,
Milwaukee, Wis.
Filed Mar. 16, 1965, Ser. No. 443,764
4 Claims. (Cl. 222—416)

This application is a continuation-in-part of my copending application Serial No. 299,722, filed August 5, 1963, now abandoned.

My invention relates to dispensing devices and more particularly to a liquid dispensing device to be applied to the outlet of a bottle or any type of container.

The prime object of my invention is to provide a dispensing stopper that will automatically seal itself after use, to preserve the contents of the container to which it is applied.

It is manifest to anyone familiar with dispensing liquor or the like from a container such as a conventional bottle, that it is customary to remove the cork, cap or seal for service and replace it after service to preserve the contents of the bottle. The device illustrated, described and claimed herein, is designed in a manner to permit it to be a part of the cork, or seal equipped with a pouring spout, so that it need not be removed from the bottle for use.

Another object of my invention is to provide a device that will seal the pouring spout of a container in a manner to prevent evaporation of the liquid contents of the bottle.

Still another object of my invention is to provide a device that requires no manual manipulation or adjustment during use.

The device is simple in construction and may be made into many varied fanciful designs.

Other and further objects of my invention will become more apparent as the description proceeds, when taken in conjunction with the drawings, in which.

Figure 1:
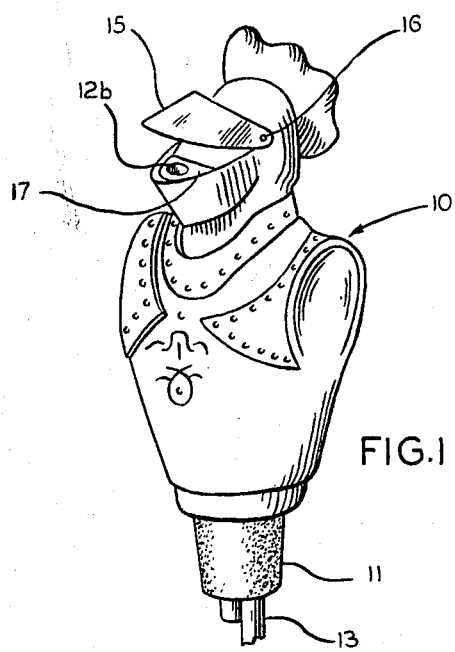
FIGURE 1 is a perspective view of a fanciful stopper for a liquor bottle or the like, showing the pouring spout in an open position.

Similar characters of reference indicate corresponding parts throughout the several views, and referring specifically now to the same, the character 10 generally designates the body of the device which may be of any fanciful design, and having a lower portion provided with a stopper or cork portion 11, for engagement with the outlet of the bottle to which it is applied.

The upper portion of the body 10 is equipped with a laterally projecting pouring lip 12, which lip has an upwardly facing flat surface 12a, an outlet aperture 12 which may be formed through a tube 12b or discharge pipe is formed in this surface outlet or pouring spout 12. The cork 11 is provided with an aperture therethrough, which aperture supports a downwardly extending tube 13.

Figure 3:
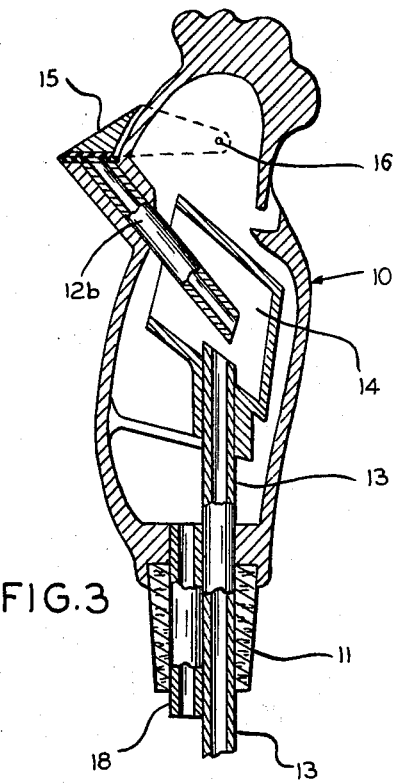
FIGURE 3 is a vertical cross-sectional view of the device shown in FIGURE 1 and illustrating a conventional measuring device inserted therein.
Figure 4:
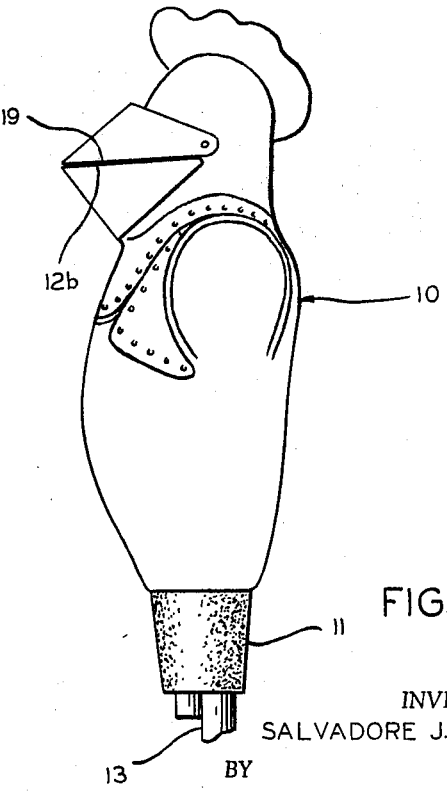
FIGURE 4 is a side view of the device shown in FIGURES 1 and 3.

The body 10 may be constructed with a hollow interior and act as an enclosure for a conventional measuring device generally shown as 14, fed by the tube 13 as an inlet and the pouring spout 12 acting as an outlet. The details of this measuring device and arrangement in FIGURE 3 form no part of my invention. The tube 13 may extend upward and be directly connected to the pouring spout 12, if desired.

Sealing means are provided for the pouring spout or lip 12. This is shown as a member 15 pivotally mounted on the upper portion of the body. Member 15 is shaped as a complementary lip which is adapted to overlie and rest on surface 12a of lip 12 when the body is upright at 16. Member 15 has a flat surface 19 which is adapted to engage the flat surface 12a at points surrounding the outlet 12b of the pouring spout 12. These complementary flat surfaces may be equipped with pads 21 and 22 of compressible material to further aid the sealing efficiency.

An auxiliary air vent or drain tube 18 may be provided in the cork 11.

The form, shape or design of the body 10 may vary, as for example the body may be shaped as a duck, in which case the "bill" of the duck would be hinged to form the part 15, and the lower projecting lip 12.

Figure 2:
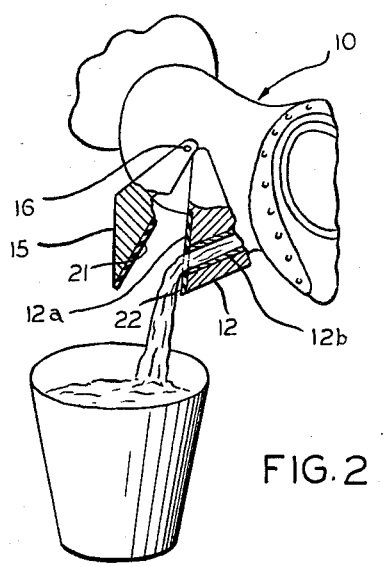
FIGURE 2 is a fragmentary view of the device in a pouring position.

When the stopper is substantially upright, the complementary surfaces of the pouring spout 12 and closure 15 bear against one another by gravity to close and seal the container. When the container or bottle is inverted, member 15 may swing away from lip 12 by gravity to allow discharge of liquid through tube 12b. Tilting of the bottle and stopper to a position generally illustrated in FIGURE 2 may cause the member 15 to swing away from the lip 12 under the force of the liquid coming out of the tube 12b.

When the bottle and stopper are returned to the upright position, the member again moves against lip or spout 12 to close the bottle.

Figure 5:
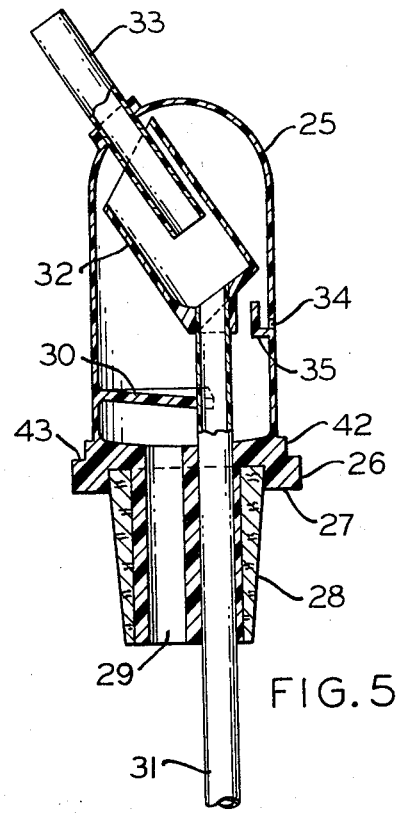
FIGURE 5 is a sectional illustration of another dispensing mechanism which may be utilized with the form of the invention illustrated in FIGURES 7 and 8.

In FIGURE 5, an inner dispensing shell 25 is defined by a plastic or metallic body having an upper portion of noncircular cross section. The dispensing assembly illustrated is intended to dispense measured quantities of liquid when the assembly is inverted according to principles well known in the art. The assembly may include a circular base portion 26 provided with a downwardly-facing flat surface 27 which may bear against the upper portion of the neck of a bottle or vessel with which the assembly is used. Suitable stopper means which may be of cork or the like are shown at 28. A liquid passage is formed through the stopper 28 as at 29 to allow liquid to flow into the shell. A baffle 30 is disposed within the shell and spaced from the lower portion of the shell in opposing relation to the flow of liquid through the passage 29. A siphon pipe 31 also extends through the stopper 28 and into shell 25 and is in communication with an upwardly open cup-like member 32, which is inclined to the axis of pipe 31 and which surrounds a discharge pipe or conduit 33. A vent 34 is formed in the shell at a point spaced above the base 26 and a baffle 35 may be positioned to minimize splashing of liquid outwardly through the vent 34. The dispensing assembly as thus described may operate according to principles known in the art, as for example, those described in Schneider Patent 2,193,043.

Dispensers of this type may operate on the principle of liquid flowing through the passage 29 and into the shell 25 when the shell and adapted bottle are inverted. When inverted, dispensing assemblies of this type may pour successive charges of liquid. Liquid may flow through passage 29 to a level which overlies the inner end of the outlet pipe 33. When liquid within the cup 32 thus closes the inner end of pipe 33, air supply through pipe 31 is cut off to the top of the inverted container thus tending to stop the flow of liquid through passage 29. The flow of liquid through passage 29 produces a differential pressure condition which causes a suction force to develop in the cup 32. This suction force operates on the liquid within the cup and surrounding the cup 32 and this suction force will pull liquid into cup 32 for discharge through the outlet 33 until the suction effect is broken. The suction effect is, of course, broken when air from either the vent 34 or from the outlet 33 may enter the cup 32 for passage to the end of the bottle. When air is resupplied to the upper end of the inverted bottle, liquid again may flow down to the shell 25 to a point where the air supply through outlet 33 is closed off and the process is repeated.

Figure 6:
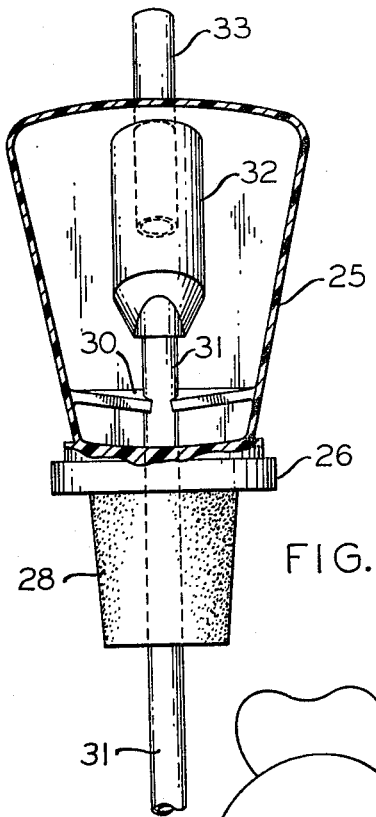
FIGURE 6 is a partial sectional illustration of the mechanism shown in FIGURE 5.

It is preferable to form the shell 25 so that it has a generally uniform width in one section, as for example in FIGURE 5, while a section transverse thereto, as in FIGURE 6, expands upwardly, thereby providing a minimum width when viewed transversely to a plane containing the outlet tube axis while providing an adequate shell volume for measuring and dispensing purposes. The upper portions of the inner shell may be curvilinear as illustrated. The overall width of the inner shell together with the extension of the discharge conduit beyond the side of the inner shell is thus somewhat less than, although greater than, one-half the overall width taken in the transverse direction.

Figure 7:
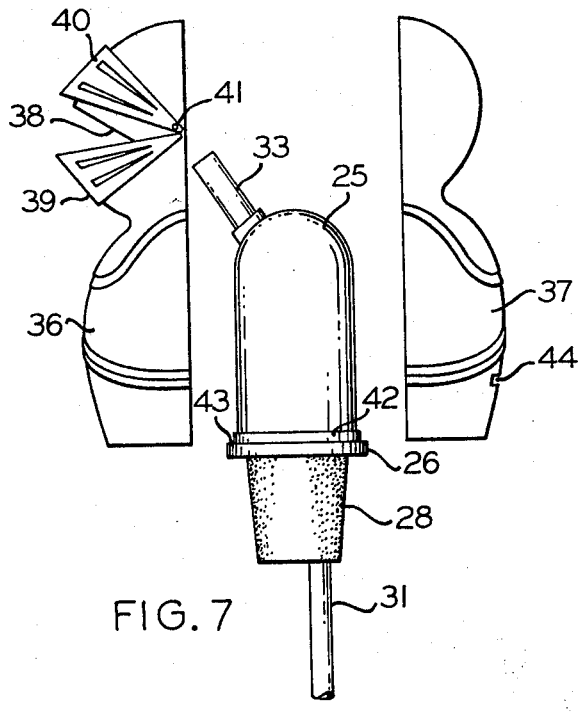
FIGURE 7 is an exploded view showing the shell halves of the dispensing device incorporating the mechanism of FIGURES 5 and 6.
Figure 8:
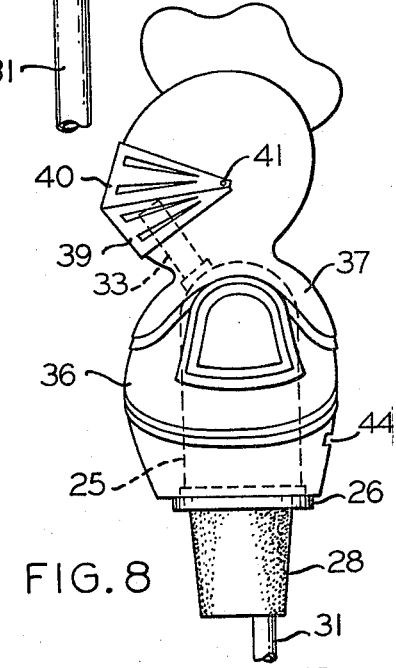
FIGURE 8 is an assembled view of the complete dispensing device illustrated in FIGURES 5, 6 and 7.

The inner dispensing assembly illustrated in FIGURES 5 and 6 is particularly formed and adapted for use with an artistic and decorative figure incorporating the general principles illustrated in FIGURES 7 and 8. In FIGURES 7 and 8, an outer shell is formed by two complementary sections 36 and 37 which, together, form an artistic and decorative surface configuration such as the knight illustrated. The outer shell sections 36 and 37 may be molded as half sections from thin-walled plastic while being so shaped as to generally match the cross sectional configuration of the inner shell 25. One outer shell section 36 may include a mouth opening or recess 38 which is positioned above a lower fixed visor 39 in the form illustrated. A swingable upper visor 40 is pivotally mounted on the upper portion of the shell section 36 as at 41. Gravity forces the upper closure or visor 40 into closing relation to the discharge opening 38.

The lowermost portions of the hollow sections 36 and 37 are shaped to match with the cross section of the base portion 42 while resting upon the shoulder 43 of the base portion.

It is preferred that portions of the hollow interiors of the outer shell sections 36 and 37 match and fit closely with the cross sectional configuration of the inner shell 25. For example, the base portions of the sections may be formed to match and fit with the base 26 while the shoulder portions match and fit with the upper portion of the inner shell. The shell portions 36 and 37 may be formed from molded plastic and fixed together along the parting line through use of adhesives or other suitable means. The outer shell may be fixed to the inner shell by suitable means although the matching fit aforementioned precludes upward removal of the outer shell from the inner shell and twisting relative thereto. A small vent 44 may be formed in one section.

When the outer shell is fully assembled in position, as illustrated in FIGURE 8, the discharge tube 33 extends in close proximity to the opening 38 so that upon inversion of the assembly, the closure 40 will swing away to the position illustrated in FIGURE 7 while a measured quantity of contents will be dispensed through the tube 33 and opening 38.

If desired, a filler piece similar to member 17 in FIGURES 1–4 may surround the tube 33 to provide a flat surface on the lower lip portion. In this event, the upper closure member may be formed with a sealing pad as generally illustrated and of the proportions illustrated in FIGURE 2 so as to effectively seal the end of the discharge tube 33 when the figure is in the upright position.

It is to be understood that various other decoratice and artistic figures may be utilized with the inner shell 25 through use of the principles of the invention herein stated.

Whereas I have shown and described an operative form of the invention, it should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. In a dispensing assembly, a liquid containing inner shell upstanding from a base with a stopper depending therefrom and adapted to fit within the neck of a container in a sealing relation and wherein a liquid passage is formed through the stopper for supply of liquid to the inner shell so that liquid supplied to the inner shell may flow from the shell through a discharge pipe extending outwardly from and inwardly within the shell and wherein a suction pipe is passed through the stopper for extension within the container and with the suction pipe extended within the inner shell and terminating in a cuplike member surrounding the inner end of said outlet pipe and wherein the inner shell has an air vent therein to supply air through said cuplike member and through said suction pipe all to effect a measured flow of liquid through the outlet pipe upon inversion of the assembly and container, a separate outer shell having an artistic external surface configuration fitted over said first named inner shell and fixed with respect thereto, said outer shell being comprised of complementary plural sections having hollowed portions receiving said inner shell in a matching interfitting relation, one section of said outer shell including an outwardly facing pouring lip, said one section receiving said discharge pipe with the outer portion of said discharge pipe terminating at said pouring lip, and closure means movably connected to said outer shell, said closure means being adapted to swing by gravity against said pouring lip when said assembly is in the upright position and being adapted to swing away therefrom when said assembly is inverted.

2. The structure of claim 1 wherein at least a portion of said inner shell has a noncircular cross section to preclude twisting of said inner shell within said outer shell.

3. The structure of claim 1 wherein said inner shell and the hollowed portion of said outer shell have upper cross sections which are larger than the cross section at the lower portions thereof, the upper cross section of the inner shell being larger than the cross section of the lower portion of the hollowed portion of said outer shell to preclude removal of said outer shell.

4. The structure of claim 1 wherein the inner shell has a substantially uniform width when viewed in one direction and a width which increases progressively from the lower portion of the shell to the upper portion of the shell when viewed in a direction at right angles to said first named direction.

References Cited by the Examiner

UNITED STATES PATENTS

| | | | |
|---|---|---|---|
| 2,193,043 | 3/1940 | Schneider | 222—416 X |
| 2,584,130 | 2/1952 | Huebl et al. | 222—455 |
| 2,689,671 | 9/1954 | Berwick et al. | 222—416 |
| 3,022,925 | 2/1962 | Daniell | 222—542 X |

FOREIGN PATENTS

| | | |
|---|---|---|
| 492,934 | 5/1953 | Canada. |

RAPHAEL M. LUPO, *Primary Examiner.*

LOUIS J. DEMBO, *Examiner.*

N. L. STACK, *Assistant Examiner.*